United States Patent
Schumann

(10) Patent No.: US 10,883,951 B2
(45) Date of Patent: Jan. 5, 2021

(54) ARRANGEMENT AND METHOD FOR DETECTING DAMAGE TO AN INNER COATING OF A CONTAINER

(71) Applicant: SIDRA Wasserchemie GmbH, Ibbenbueren (DE)

(72) Inventor: Joachim Schumann, Dessau-Rosslau (DE)

(73) Assignee: SIDRA Wasserchemie GmbH, Ibbenbueren (DE)

( * ) Notice: Subject to any disclaimer, the term of this patent is extended or adjusted under 35 U.S.C. 154(b) by 10 days.

(21) Appl. No.: 16/095,466

(22) PCT Filed: Apr. 15, 2017

(86) PCT No.: PCT/DE2017/000110
§ 371 (c)(1),
(2) Date: Oct. 22, 2018

(87) PCT Pub. No.: WO2017/186204
PCT Pub. Date: Nov. 2, 2017

(65) Prior Publication Data
US 2019/0137429 A1    May 9, 2019

(30) Foreign Application Priority Data
Apr. 28, 2016  (DE) .......... 10 2016 005 112

(51) Int. Cl.
*G01N 27/20* (2006.01)
*G01R 31/50* (2020.01)
*B65D 90/48* (2006.01)
(52) U.S. Cl.
CPC .......... *G01N 27/205* (2013.01); *B65D 90/48* (2013.01); *G01R 31/50* (2020.01)

(58) Field of Classification Search
CPC ...... G01N 27/205; G01N 11/16; B65D 90/50; B65D 90/48; G01R 31/50; G01F 1/8436; G01F 1/8413
(Continued)

(56) References Cited

U.S. PATENT DOCUMENTS

| 3,555,414 A | 1/1971 | Deichelmann |
| 4,543,525 A | 9/1985 | Boryta et al. |

(Continued)

FOREIGN PATENT DOCUMENTS

| DE | 9311620 | 10/1993 |
| EP | 0 637 554 | 2/1995 |

(Continued)

OTHER PUBLICATIONS

Aug. 8, 2017 International Search Report of counterpart PCT International Application No. PCT/DE2017/000110, filed on Apr. 15, 2017 (4 pages).

*Primary Examiner* — Vincent Q Nguyen
*Assistant Examiner* — Trung Nguyen
(74) *Attorney, Agent, or Firm* — Cohen & Hildebrand, PLLC

(57) ABSTRACT

Arrangement and method for detecting damage to an inner coating of a container is provided. The arrangement has been devised which is influenced by damage to the inner coating and/or actuation of plant parts (shut-off valves) and/or by electrical changes in the current paths. This is accomplished such that the latter generates a reproducible signal excursion which can be assigned to the respective activity and therefore to the corresponding parts of the plant, such as a container. Thus, by means of the measuring arrangement, both slowly changing values, which arise as a function of process-induced slowly changing process parameters, such as temperature, concentration, conductivity, and other (Continued)

Figure 1:
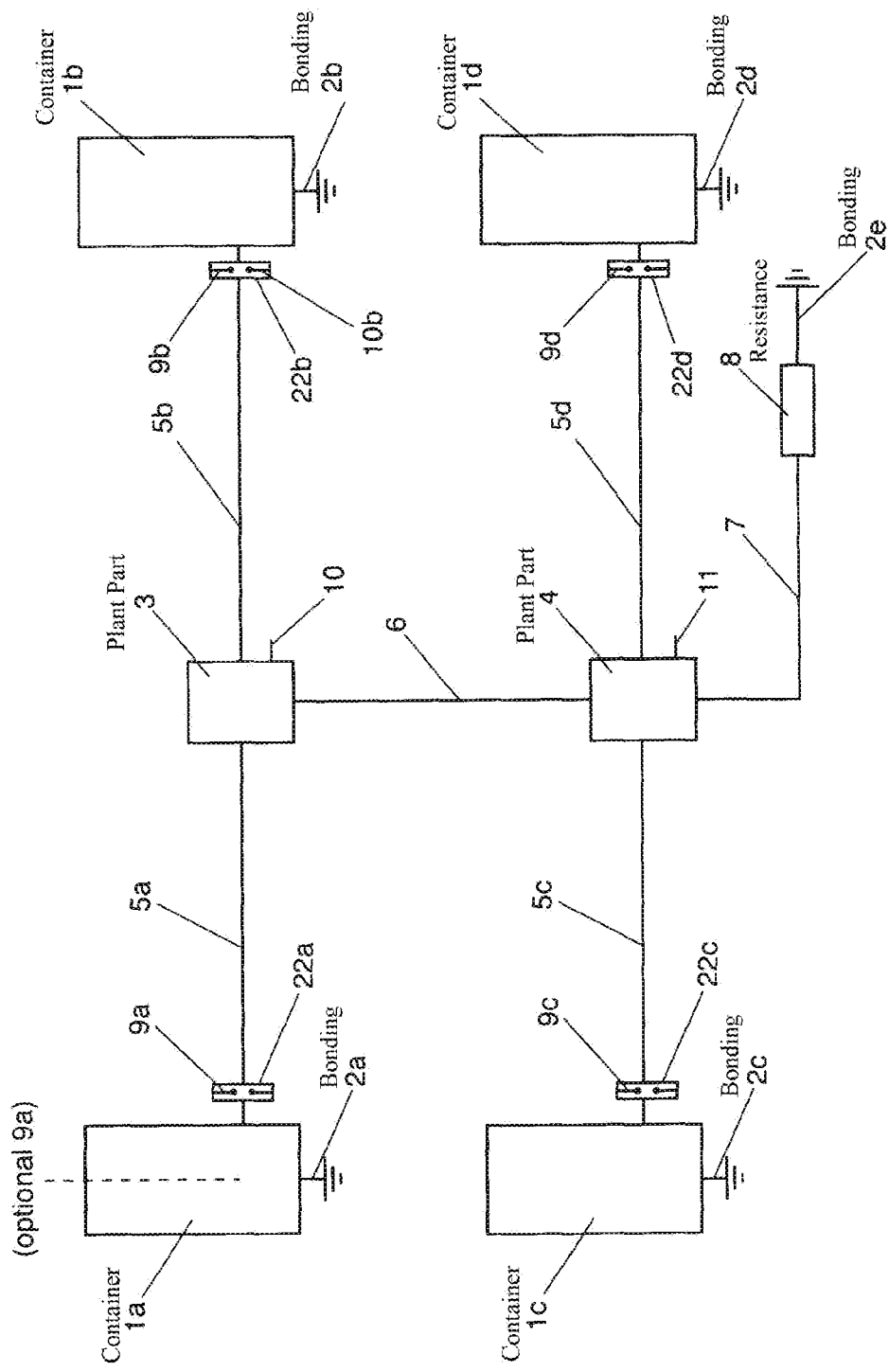

gradually occurring damage to an inner coating, and also short-term significant changes of values are detected, which are brought about e.g. by pumping operations or by connecting together plant parts, which influence the electrical properties of the system. The detected signal excursion is interpreted.

13 Claims, 4 Drawing Sheets

(58) Field of Classification Search
USPC ......... 324/252, 200, 250, 403–407, 453, 87, 324/76.11, 500, 514, 754.04, 306, 325, 324/353, 754.15, 92
See application file for complete search history.

(56) References Cited

U.S. PATENT DOCUMENTS

| | | |
|---|---|---|
| 4,985,682 A | 12/1991 | Boryta |
| 5,191,785 A | 3/1993 | Kidd et al. |
| 6,662,632 B1 | 12/2003 | Parker et al. |
| 2006/0000711 A1 | 1/2006 | Hung-Hsiang et al. |
| 2009/0051554 A1 | 2/2009 | Jarvie et al. |
| 2011/0186537 A1* | 8/2011 | Rodriguez San Juan ................... A61M 5/3129 215/355 |

FOREIGN PATENT DOCUMENTS

| | | | |
|---|---|---|---|
| WO | 1993/024819 | 12/1993 | |
| WO | 2009/157773 | 12/2009 | |
| WO | WO2009/157773 A1 * | 12/2009 | ............. G01N 27/20 |

* cited by examiner

ARRANGEMENT AND METHOD FOR DETECTING DAMAGE TO AN INNER COATING OF A CONTAINER

This is an application filed under 35 USC § 371 of PCT/DE2017/000110, filed on Apr. 15, 2017 claiming priority to DE 10 2016 005 112.4 filed on Apr. 28, 2016, each of which is herein incorporated by reference in its entirety.

BACKGROUND OF THE INVENTION

The invention relates to an arrangement for detecting damage to an inner coating of a container, wherein the container has a container wall made of a conductive material, which is connected to a lightning protection or equipotential bonding and wherein in the container or in a pipe leading into the container, a first electrode is arranged for a first measuring point, which is connected to a measuring arrangement, wherein the pipe and the container are at least partially filled with an electrically conductive process liquid and wherein the container wall has an insulating inner coating made of plastic.

The invention also relates to a method for detecting damage to an inner coating of a container, wherein a container connected to a lightning protection or equipotential bonding with a first electrode disposed in the container for a first measuring point is provided, wherein the pipe and the container are at least partially filled with an electrically conductive process liquid and wherein a container wall of the container is provided with an insulating inner coating made of plastic.

Work or storage containers, which usually consist of a metallic material, such as steel, are used in many industrial applications. The present invention relates to such containers in which chemically aggressive fluids are stored. Such a fluid may, for example, be a liquid, also referred to as a process fluid, which may be an acid, a base, and any intermediate or end product of a manufacturing process. Most of these process liquids are corrosive and have a variable conductivity.

To prevent chemical reactions of the process liquid with the material of the working or storage container, the container is lined with an insulating rubber layer, the so-called inner coating. This single- or multi-layer rubber layer prevents a chemical reaction between the fluid and the container material and thus both a change in the composition of the fluid itself as well as a destruction of the container. If damage occurs anywhere on the rubber layer, the layer can no longer fulfill its function. In order to prevent a reaction of the container material with the fluid and a possible destruction of the container at the damaged area(s), it is necessary to recognize these damages as quickly as possible and to eliminate their cause.

Such containers can be placed both stationarily and on a vehicle, such as a rail vehicle or a truck. Also conceivable is an arrangement of such containers within a container, which can be transported by means of a rail vehicle or a truck.

However, a simple application of a measuring voltage, for example between the conductive container wall of a steel container and an electrode arranged in a conductive fluid, can lead to electrolysis and thus influence the measurement result.

It is customary to ground the container wall for lightning protection reasons, in which case a resistance value R between the container and lightning protection or the equipotential bonding on the order of less than 50 ohms can be measured.

Frequently, the process fluids are transferred from the electrically conductive, grounded container to a destination site via non-conductive plastic pipes.

The electrically conductive process liquids do not necessarily have to have an electrically conductive connection to ground, to lightning protection or to potential equalization. The worse such a connection is, the easier becomes the electrical detection of damage to an inner coating of a container (lining damage), since current can then ideally flow from the process liquid to the container wall only via the defective lining of the container.

Inadvertently, however, an electrically conductive connection is frequently caused by the process liquid to the ground, to the lightning protection or to the potential equalization, for example via the following current paths, which is of no concern for the actual process:

electrically conductive pump housings, pump seals or similar elements which are grounded;

mass balancing disks on inductive and other flowmeters, which may also be grounded;

heat exchangers, which are themselves electrically conductive and have a ground fault via electrically conductive heat transfer media such as cooling water or which are themselves integrated into the lightning protection as plant components.

Even when the heat exchanger itself is not connected to a lightning protection or to equipotential bonding, the medium cooling water is usually connected either via a metallic cooling water line or by virtue of its own conductivity with an adjacent equipotential bonding (ground). In this case, a resistance R can be measured between the process liquid and the equipotential bonding. The exact measured value depends on the distance of the measuring point to the equipotential bonding, the conductivity of the cooling medium, the pipe cross-section, the pipe length, the measuring method used, the electrode area and the length of the current path.

A simple measurement of the resistance R between the process liquid and the container wall as well as the lightning protection or the equipotential bonding would result in an infinite resistance in the case of a fully functional rubber layer of the container. However, a resistance Rp of the path process liquid, heat exchanger, cooling water and equipotential bonding of the power supply is connected in parallel with this measured resistance R. This parallel connection changes the total resistance Rg as measured with a functional rubber layer to a value in the range between several hundred ohms and several megohms. The measured resistance values depend in turn on the measuring technique used, which affects the measurement result depending on the electrode area, the length of the current path as well as the measuring voltage and/or the measuring current.

For example, values in the range of several hundred ohms are measured with commercially available grounding resistance testers with a measurement voltage of less than 50 volts and a test current of a few milliamperes. Resistance values of several megohms are determined with an ISO meter having a measuring voltage of less than 50 volts and a test current of approximately 0.5 milliamps.

A separate determination of the values of the resistors R and Rp is rarely possible because of the process control during operation. Even during a shutdown, the separate determination of the resistance sizes usually fails because of the disproportionately high complexity, for example, because lines would have to be emptied or interrupted in order to reliably exclude parallel resistances or resistance paths.

Several methods for detecting damage to the inner coating of steel containers are known from the prior art, which use the conductivity of a process liquid, provide a multiple coating of the container, usually with an electrically conductive layer or an electrically conductive intermediate layer or with introduced electrodes, and have a corresponding evaluation circuit.

A solution for the detection of damage to an inner coating for a container or boiler is known from DE 93 11 620 U1. Here, a second electrically conductive rubber layer is installed under a first rubber layer which is resistant to the aggressive fluid to be stored in the container. To test the functionality of the first rubber layer, a resistance measurement is performed between the conductive rubber layer and an electrode introduced in the conductive fluid.

In the event of damage, the resistance value in the resistance measurement would significantly decrease. It is thus possible to detect and display damage in the first rubber layer, for example by way of an alarm.

It is also possible to subdivide the area(s) to be monitored into several test areas in order to be able to better localize damage in the first rubber layer.

Furthermore, another rubber layer with the properties of the first rubber layer may be placed underneath the electrically conductive rubber layer. This third rubber layer has the advantage that when damage is detected in the first rubber layer and an alarm is triggering, the production process can be continued at least temporarily, since there is not yet an immediate threat to the container from the aggressive fluid because the third rubber layer protects the container from the fluid.

WO 93/24819 A1 discloses a solution for detecting damage to an inner coating of a container, in which a container has a multilayer wall construction. If a conductive fluid is stored into the container, then the container may be made of a conductive material such as steel and thus form one of the layers of the wall construction. The inside of this steel container is covered with a non-conductive layer. In addition, the outside of the steel container may also be coated with a non-conductive layer.

With this solution, damage to the inner nonconductive layer can also be detected with a resistance measurement between an electrode inserted into the conductive fluid and the steel wall of the container. Here, too, damage is detected by a significant reduction in the measured resistance which can be displayed accordingly.

U.S. Pat. No. 5,191,785 A also discloses a multilayer wall construction for detecting damage to the inner coating of a container. It is disclosed that instead of a conductive foil, a more resilient fleece is used, which is made of a material containing graphite, carbon or metal particles and is connected to several electrodes.

In this case, too, damage is detected and displayed by way of a resistance measurement.

U.S. Pat. No. 6,662,632 B discloses an arrangement for detecting damage to an inner coating of containers, which can be transported by railcar or truck. Two electrodes are installed in the conductive fluid and two additional electrodes are installed on the outer shell of the tank. The damage can be detected during transport of the container through appropriate resistance measurements.

U.S. Pat. No. 4,985,682 A discloses an arrangement for monitoring the continuity and presence of a potential leak rate of an underground tank. For this purpose, a tank in the ground is placed in a trough which is intended to protect the environment in the event of a defect on the tank.

The solution requires a variety of special conditions to be maintained or created, such as ground probes and cables, test shafts in a wet "base layer", a "standard electrode" to be calibrated and the like, so this solution is very costly to implement. Another disadvantage of this solution is that a faulty trough lining can only be detected in a state when damage to the container, the well casing and the environment has already occurred.

U.S. Pat. No. 3,555,414 A discloses a method and a device for detecting damage in a container. This solution is used to detect corrosion currents/voltages when steel or iron containers are attacked due to defective enamel or another defective insulating coating. A start-up procedure for passivation of the tantalum electrodes and a prescribed electrical polarity of the system must be adhered to, thus making the process is very expensive.

In addition, the system must be specially adjusted to the particular container and its contents. Electrically conductive connections of the process medium via other system components, such as a heat exchanger, to ground, to equipotential bonding or to lightning protection with variable resistance values (due to variable fill levels/cable cross-sections/media) which go beyond the circuit between the tantalum screws, make the adjustment obsolete and lead to error messages.

Thus, according to the known state of the art, all embodiments for the detection of damage to an inner coating of a container require, for example, additional layers and electrodes, while still not being able to rule out during a necessary resistance measurement an electrolysis that changes the composition of the fluid. In addition, such tanks are usually part of a larger complex system, whereby the resistance measurement for detecting damage can be falsified by unintentionally forming parallel resistors. In addition, the magnitude of these parallel resistors still depends on the current state of the system and can hence only be detected with great difficulty.

BRIEF SUMMARY OF THE INVENTION

The object of the invention is to provide an arrangement and a method for detecting damage to an inner coating of a container, thereby enabling a simple, safe and cost-effective determination of damage.

The object is attained by an arrangement for detecting damage at an inner coating of a container, wherein the container comprises a container wall made of a conductive material, which is connected to a lightning protection or equipotential bonding and wherein a first electrode for a first measuring point is arranged in the container or in a pipe leading into the container, which first measuring point is connected to a measuring arrangement, wherein the pipe and the container are at least partially filled with an electrically conductive process liquid and wherein the container wall has an insulating inner coating made of plastic, wherein the container is connected to a plant part via a first pipe made of an electrically non-conductive material, a second measuring point is arranged on the plant part, that the first measuring point is arranged on a first electrode of a plastic intermediate flange disk or on an electrode in the container, and that the measuring arrangement is connected for electrical conduction with the first measuring point and the equipotential bonding or with second measuring point.

Further, the object is attained by an arrangement for detecting damage to an inner coating of a container, wherein the container comprises a container wall made of a conductive material, which is connected to a lightning protection or equipotential bonding and wherein a first electrode for a first measuring point is arranged in the container or in a pipe leading into the container, which first measuring point is connected to a measuring arrangement, wherein the pipe and the container are at least partially filled with an electrically conductive process liquid, and wherein the container wall has an insulating inner coating made of plastic, wherein the measuring arrangement comprises a first controllable voltage source, which is connected with its first terminal via an ammeter to the first measuring point in a plastic intermediate flange disk and with its second terminal to the equipotential bonding, a second controllable voltage source, which is connected with its first terminal to a first electrode of a further plastic intermediate flange disk arranged in a second pipe or in a third pipe and with its second terminal to the equipotential bonding, and a voltmeter, which is connected between a second measuring point of the further plastic intermediate flange disk and a second measuring point of the plastic intermediate flange disk.

Further embodiments are described by the measuring arrangement which comprises a voltage source and a voltmeter, wherein the voltage source is connected with a first terminal to the first measuring point and with a second terminal to the equipotential bonding or to the second measuring point, and wherein the voltmeter is connected between the first measuring point and directly or via a capacitance with the equipotential bonding or the second measuring point. The measuring arrangement may be a grounding resistance tester or an ISO meter. The measuring arrangement may be connected to two first measuring points of two containers and/or to the second measuring point and a third measuring point), which is arranged on a second plant part. The first voltage source and/or the second voltage source is a DC voltage source or a controllable AC voltage source or a frequency-synchronous controllable AC voltage source.

It is contemplated to carry out a measurement of an electrical variable such as an insulation value or a resistance for detecting damage to the inner coating of a container with a measuring arrangement. Alternatively, the damage can also be detected by a voltage measurement and/or a current measurement using suitable voltage sources and corresponding wiring within the measuring arrangement.

In this case, the measuring arrangement is arranged such that the measurement of the electrical variable takes place across several parts of a plant in which the container to be monitored is arranged. In contrast, a measurement according to the prior art only takes place between an electrode arranged in the container and the metallic container wall.

The measuring arrangement can be designed in two completely different variants: According to the first variant, the disturbance of the measuring arrangement due to damage in the lining is detected, which causes generation of an additional current path, which causes a significant signal change in the measuring arrangements used. This first variant is described below with reference to FIGS. 2 and 3.

According to the second variant, a fault current caused by damage in the lining is detected, which flows from the process medium through the defective lining via the metallic container wall to the ground/lightning protection/equipotential bonding. This second variant will described below with reference to FIG. 4.

For the first variant, in a first alternative embodiment of the first variant, a commercially available grounding resistance tester can be used, such as a CHAUVIN ARNOUX CA 6460 device or similar devices suitable for a discontinuous test.

For the first variant, in a second alternative embodiment, a commercially available ISOMETER can be used, such as a BENDER iso 685 or similar devices, which are suitable for continuous testing.

The aforementioned device types measure resistances and attain their highest sensitivity, when the test leads to the measuring points are designed as 2-wire leads.

Figure 2:
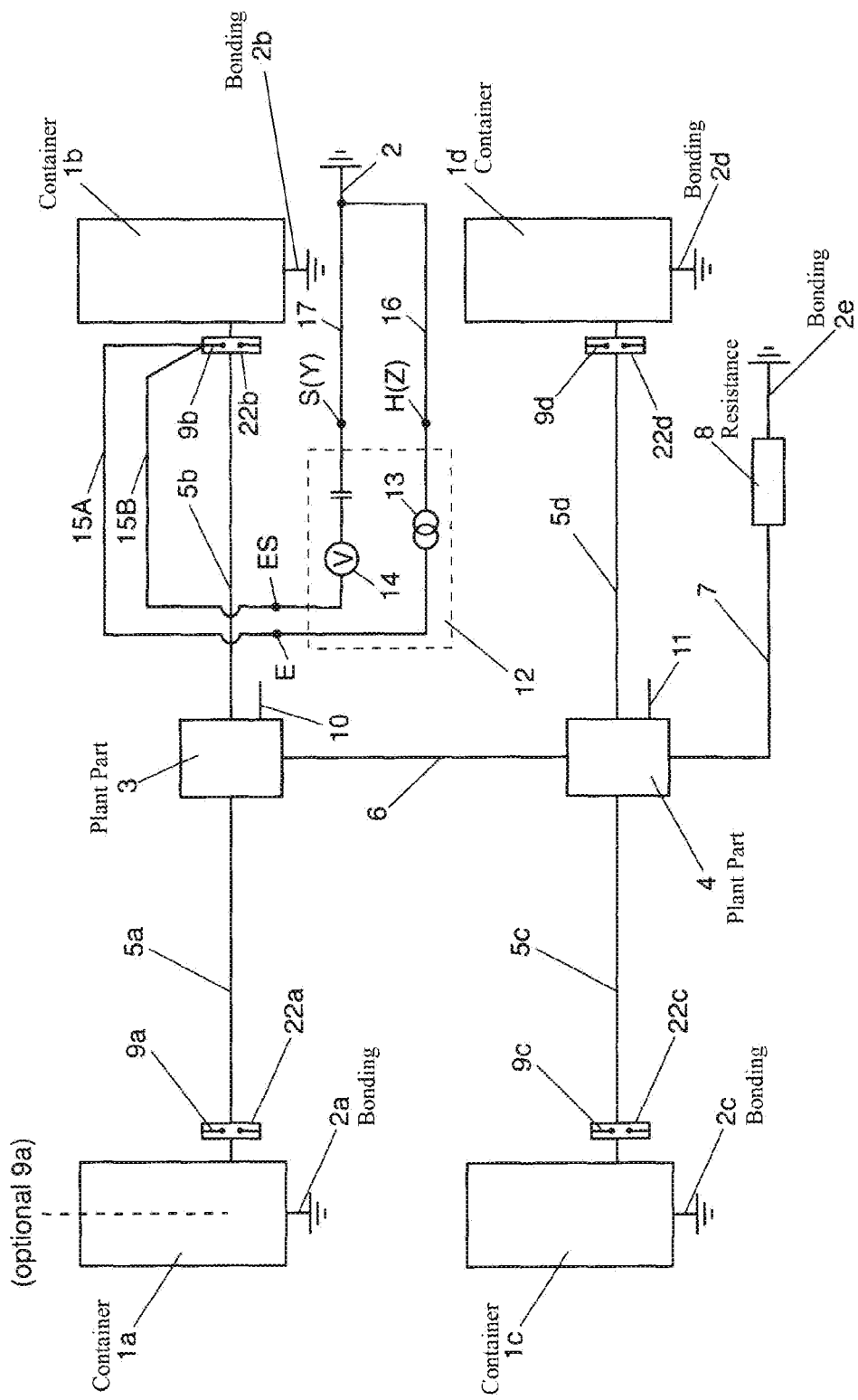
Figure 3:
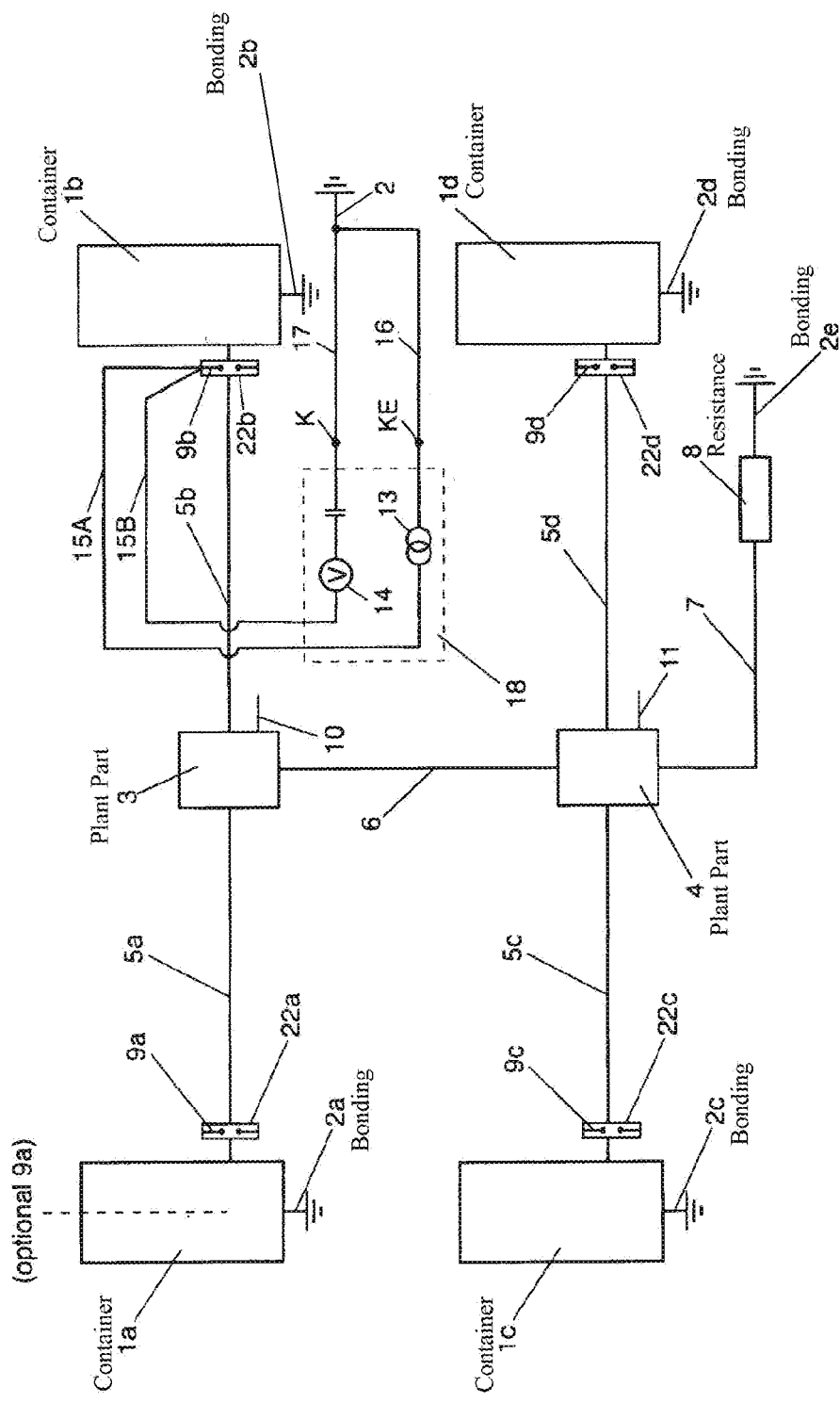

The ideal measuring arrangements shown by way of example in FIGS. 2 and 3 may optionally be altered. This can be done, for example, by separating the two illustrated measuring points into three to four measuring points. This separation allows adaptation of the signal strengths to be expected in the event of damage to the standard measuring ranges of the above-mentioned devices.

In less critical applications, a 2-wire measuring line can be combined into only a single measuring line to reduce cost. For example, in FIG. 2 the lines E and ES could be combined into a measuring line E/ES, or in FIG. 3 the lines K and KE could be combined into a measuring line K/KE.

If damage cannot be detected with the above-described first variant of the measuring arrangement or the associated devices in both the first alternative and in the second alternative, then the second variant of the measuring arrangement can be used in a third alternative. The technique required for this third alternative is also commercially available.

In this third alternative, the first and second measuring points are each connected to a controllable DC voltage source or to a controllable frequency-synchronized AC voltage source, and the voltage between the two measuring points is monitored. The voltage measured on the voltmeter between these two measuring points is adjusted to zero Volt by adjusting one or both voltage sources accordingly. This voltage regulated to zero Volt drops across non-critical equipment parts which can be easily monitored by visual inspection, for example across a plastic pipe leading to a container. For this regulated case, where the voltage drop between the measuring points is zero Volt, current flow detected at the first voltage source (DC voltage source or variable frequency synchronous AC voltage source), which is located in close proximity to the container(s) to be monitored, is an indication of a defective rubber layer on a container wall, i.e. damage to an inner coating of one or more containers to be monitored. The current flow of the second voltage source is not evaluated, since this current flows to the equipotential bonding across plant parts which are connected electrically in the normal state ("good state").

The invention also contemplates monitoring several containers simultaneously. For this purpose, the first measuring points of several containers, i.e. the electrodes arranged in each case near the container, are connected to one another. In addition, several second measuring points on different other system parts can be interconnected.

The object is also attained by a method with the features according to claims 9 and 11 of the independent claims. Further embodiments are recited in the dependent claims 10, 12 and 13.

For detecting damage to an inner coating of a container, it is known to measure a resistance between an electrode arranged in or on the container to be monitored and the metallic container housing. Since this measurement is influenced by the conductive fluid stored in the container, which fluid is more or less conductively connected to other components of the system via pipes, the invention contemplates to perform a measurement between the electrode arranged in or on the container and a second measuring point remote from the container. This second measuring point can be attached to a plant component connected to the container to be monitored via a pipe. Such plant components may be, for example, heat exchangers or other plant components in contact with the fluid.

In such a measurement, effects from resistances, which develop in the plant and which are parallel to the insulation resistance of the container, are taken into account.

To detect damage on an inner coating of a container, the method utilizes a measurement of resistance or insulation resistance, or a voltage measurement and/or a current measurement using suitable voltage sources.

The invention contemplates to evaluate the measurement result and to output the measurement result as an analog or digital signal and to thus indicate the condition of the container to be monitored, at least with the categories "good state" or "damage on the inner coating". Such an output signal may also serve as an input for a central system controller and thus Influence the process flow during the control of the plant. For example, the connection to the container affected by the damage may be closed or shut off.

BRIEF DESCRIPTION OR THE DRAWINGS

Further details, features and advantages of embodiments of the invention will become apparent from the following description of exemplary embodiments with reference to the accompanying drawings, which show in:

FIG. 1: a schematic diagram of a plant with multiple containers to be monitored, FIG. 2: a first embodiment of the invention (variant 1, alternative 1, grounding measurement) for detecting damage to the inner coating of containers, FIG. 3: a second embodiment of the invention (variant 1, alternative 2; ISOMETER) for detecting damage to the inner coating of containers, and FIG. 4: a third embodiment of the invention (variant 2, alternative 3; determination of the flow of current through the defective container) for detecting damage to the inner coating of containers.

DETAILED DESCRIPTION OF THE INVENTION

FIG. 1 shows in a schematic diagram a plant with the essential elements for the present invention. The diagram shows four containers $1a$, $1b$, $1c$ and $1d$, each having a lightning protection or equipotential bonding $2a$, $2b$, $2c$ and $2d$, via which they are connected to a ground potential. The fluid, which is also referred to as a conductive process liquid, is stored in these containers $1a$, $1b$, $1c$ and $1d$.

The system further includes two parts 3 and 4 of the plant, which are connected via pipes 5 with the associated containers 1. The first plant part 3 is connected via the pipe $5a$ to the first container $1a$ and via the pipe $5b$ to the second container $1b$. The second plant part 4 is connected via the pipe $5c$ to the third container $1c$ and via the pipe $5d$ to the fourth container $1d$. Electrically non-conductive plastic pipes are typically used for the pipes $5a$, $5b$, $5c$ and $5d$.

Such plant parts 3 and 4 may, for example, be heat exchangers. Other elements or assemblies, which are connected to the container 1 via a pipe 5 and through which the fluid flows, can also be understood to represent plant parts 3 and 4. Hereinafter, by way of example, a heat exchanger is used as plant part 3 and 4.

FIG. 1 also shows a second pipe 6 arranged between the first and the second heat exchangers 3 and 4. The exemplary second heat exchanger 4 is shown to be connected to a third pipe 7 for supplying a cooling medium. The first heat exchanger 3 can also have such a connection, which is not shown in FIG. 1.

A resistance 8 is depicted in the region of the third pipe 7, which is a function of the electrical conductivity of the fluid flowing through the pipe 7. This resistance is shown here by way of example only. Such a resistor 8 has been omitted in the lines $5a$, $5b$, $5c$ and $5d$, although it may also be present therein. The same applies to the pipe 6, if it is made of a non-conductive material.

With reference to the third pipe 7, it is shown by way of the marked resistor 8 that the second heat exchanger 4, even if this heat exchanger 4 itself does not have a lightning protection or equipotential bonding, is connected with its resistance 8 at least via a equipotential bonding $2e$ to a ground potential via the cooling water flowing in the pipe 7.

For protection against the aggressive process fluid stored therein, the containers $1a$, $1b$, $1c$ and $1d$ are provided with an inner coating made of plastic, the functionality of which is to be monitored by the present invention.

A first measuring point $9a$, $9b$, $9c$ and $9d$ is provided inside each container $1a$, $1b$, $1c$ and $1d$ or in each line $5a$, $5b$, $5c$ or $5d$ leading to a container $1a$, $1b$, $1c$ and $1d$ which may be embodied as a contact in the electrically conducting process liquid (immersion probe). The embodiment with an immersion probe in the container $1a$ is shown in FIG. 1 by a dash-dash line. Alternatively, the measuring points $9a$, $9b$, $9c$ and $9d$ may be arranged as probes in the line $5a$, $5b$, $5c$ or $5d$ proximate to the container $1a$, $1b$, $1c$ or $1d$ to be monitored. These probes are, for example, designed as a plastic intermediate flange disk 22 with, for example, two integrated tantalum probe heads in contact with the fluid and installed at a junction between a plastic tube and the flange of the internally coated steel container. In this embodiment, the measuring point $9a$, $9b$, $9c$ or $9d$ is located directly on the container $1a$, $1b$, $1c$ or $1d$. The electrodes forming the measuring points $9a$, $9b$, $9c$, $9d$ can be arranged, for example, opposite one another and electrically separated from one another in the plastic intermediate flange disk 22. Furthermore, for the arrangement according to FIG. 2 and/or FIG. 3, the measuring points $9a$ to $9d$, which are not connected to the measuring arrangement, can be set to a potential. Alternatively, it is also possible to interconnect or short-circuit the respectively opposite electrodes, for example $9b$ to $10b$, to increase the electrode surface on, for example, the plastic intermediate flange disk $22b$ used for the measurement.

A second measuring point 10 is provided at the first heat exchanger 3 and a third measuring point 11 is provided on the second heat exchanger 4. In addition, a further second measuring point $10b$ may be provided on the second plastic intermediate flange disk $22b$.

All measuring points 9, 10 and 11 are designed so that they can be connected via an unillustrated line with a centrally arranged measuring device. For example, leads from the measuring points 9, 10 and 11 lead to a central office, in which the system is regularly monitored and controlled.

The plant illustrated in FIG. 1 shows only the components and compounds essential for the explanation of invention. Of course, such plant may have further modules, plant parts and pipes in order to fully fulfill their function.

FIG. 2 shows the plant already known from FIG. 1 with its already described components and connections. FIG. 2 shows a first embodiment of the invention for detecting damage to the inner coating of a container 1a, 1b, 1c or 1d in the first alternative of the first variant with a grounding measuring device.

For this purpose, a resistance measuring device is used, which can be for example a grounding resistance tester (e.g. CHAUVIN ARNOUX C.A 6460) or an ISOMETER (e.g. BENDER iso 685), which is equipped with a voltage source 13, a voltmeter 14 or components for calculating, displaying, possibly also storing the temporal course of the resistance of the individual resistance measurements between the measuring points 9b, or 9a, 9c or 9d, and equipotential bonding.

The connection to the different measuring points can be suitably designed by inserting unillustrated switches into the test leads. For example, such switches can be used to connect the first terminal 15A and/or 15B of the grounding resistance tester 12 either to the first measuring point 9b or alternatively to the first measuring point 9a. The switches may be switched on and off, for example, under control by a central control or manually.

Irrespective of whether a discontinuously measuring grounding resistance tester or a continuously measuring ISOMETER is used as measuring device 12 or as measuring device 18 in FIG. 3, the most important task in the choice of measuring points is to connect them in such a way that the measured resistance values in the "GOOD" state are within the measurement range limits of the measuring device 12 (18).

While an ISOMETER in the "GOOD" state can measure several megohms, the measuring range of grounding resistance testers is at most a few kilo ohms.

This means that ISOMETERN are better suited to measure directly between "container-proximate" measuring points, such as the measuring points 9a, 9b, 9c, 9d, and measuring points, which are close to ground potential, the equipotential bonding or the container wall.

Grounding resistance testers 12 should therefore more likely between "container-proximate" measuring points 9a, 9b, 9c, 9d and measuring points which are located closer to the container 1a, 1b, 1c, 1d to be monitored, which can be, for example, the measuring points 10, 11, but also other measuring points 9.

Figure 4:
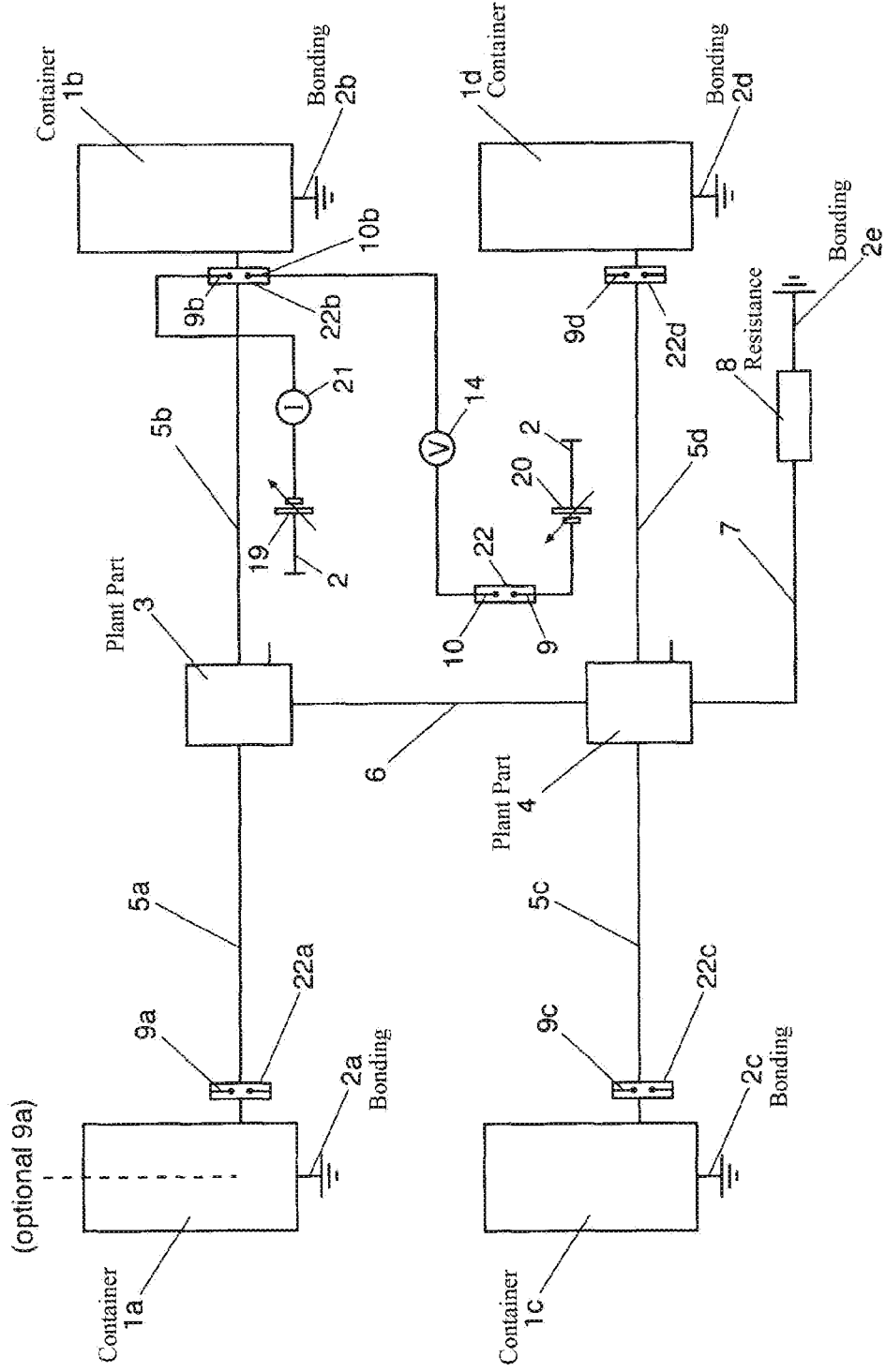

If it is not possible to use of commercially available grounding resistance testers or ISOMETER by appropriate selection of the measuring points and their location in the container system and the structural design of the electrodes contacting the process medium (surface size), then the second variant with the third alternative, which is shown in FIG. 4, can be used.

In an example shown in FIG. 2, a grounding resistance tester 12, which can be designed, for example, as a three-terminal or four-terminal device, and which provides, for example, a pulsed measuring voltage is used. Alternatively, the components of the grounding resistance tester 12, which includes a voltage source 13 embodied as an AC voltage source or a pulsed DC voltage source, as well as a voltmeter 14, can be simulated in a circuit.

It is intended to connect the terminals 15A and 15B of the grounding resistance tester 12 to the first measuring point 9b, i.e. to an electrode of the plastic intermediate flange plate 22b. These connection points are referred to as E and ES at the grounding device 12.

The second connection 16 of the grounding resistance tester 12 is connected to equipotential bonding, as shown in the example of FIG. 2. This terminal 16 is also designated as H(Z).

The third terminal 17 of the grounding resistance tester 12, which is also designated as S(Y), is likewise connected to a grounding point, a lightning protection or equipotential bonding.

In an alternative, the second connection 16 and the third connection 17 may be connected for a measurement to the second measuring point 10 of the heat exchanger 3 or to the third measuring point 11 of the heat exchanger 4.

For example, a commercially available 3-terminal or 4-terminal grounding resistance tester, as offered by the company Chauvin Arnoux, which has the described terminals 15A, 15B, 16 and 17, can be used. This grounding resistance tester operates with a pulsed measuring voltage, which is detected by the grounding resistance tester itself as its own measuring voltage.

By means of the voltage source 13 (AC voltage source or pulsed DC voltage source), in the example a pulsed measuring voltage is applied as a so-called test voltage between the measuring point 9b and the equipotential bonding.

When the inner coating of the connected container or containers 1a, 1b, 1 c or 1d is intact, a specific voltage value is determined with the voltmeter 14 and an associated value R for the insulation is displayed by the grounding resistance tester 12.

The value R decreases in the event of damage to an inner coating of a container 1a, 1b, 1c or 1d. The reason for the decrease is a further current path, which extends from the first terminal 15A/15B, for example via the first measuring point 9b of the plastic intermediate flange disk 22b, the conductive fluid in the container 1b through the defective inner coating to the steel container itself and the potential equalization 2b. Although the absolute value for an intact inner coating of all containers 1a, 1b, 1c and 1d depends on the various plant components and on the currently process running in the plant, damage to the inner coating causes a noticeable perceptible drop of the displayed value.

For example, the values for different plant conditions may be acquired and stored, thus allowing a comparison in the event that one or more inner coatings become defective.

In addition detecting damage, it is also possible to isolate the damage in such a way that the associated container 1a, 1b, 1c or 1d can be determined. For this purpose, the first terminal 15A/15B of the measuring device 12 is successively connected to the first measuring point 9a, 9b, 9c and 9d, and the displayed value is observed while a valve attached to the inlet of the respective container 1a, 1b, 1c or 1d is closed and opened. Since closing a valve interrupts an electrically conductive fluid path, the displayed previously measured value changes significantly when the valve on the container 1a, 1b, 1c or 1d having the damaged inner coating is closed. Thus, the defective container 1a, 1b, 1c or 1d is located and can accordingly be removed from the ongoing process and/or repaired.

FIG. 3 shows a second alternative of the first variant, wherein damage to an inner coating of a container 1a, 1b, 1c, 1d is detected with an ISO meter 18. In this embodiment, for example, the first terminals 15A and 15B of the ISO meter 18 are connected to a first electrode 9b of, for example, two electrodes disposed opposite each other in the plastic intermediate flange disk 22 and in communication with the fluid. The second terminal 16 and the third terminal 17 is connected to the equipotential bonding 2 as shown. Alternatively, the second port 16 and the third port 17 may be connected for the measurement to the second measuring point 10 of the heat exchanger 3 or to the third measuring point 11 of the heat exchanger 4.

With this measuring arrangement, damage to an inner coating of a container can be determined by performing a first measurement of the resulting resistance R when a valve (fitting) disposed between the plastic intermediate flange disk 22b and the container 1b is in an open state. In addition, a second measurement of the resistance R is performed when the valve is in a closed state. In the event that the inner coating of the container 1b is defective, values are measured that clearly differ from each other, since closing of the valve causes an interruption of the current path via the conductive fluid. If there is no significant change in the measured resistance R in both cases, the inner coating of a container 1b is undamaged.

FIG. 4 shows the second variant of the measuring arrangement and thus a third alternative of the invention. This second variant is again based on an already known design of the plant with four containers 1a, 1b, 1c and 1d, two heat exchangers 3 and 4 and the corresponding connecting pipes. The measuring points 9a, 9b, 9c, 9d necessary for detecting damage to an inner coating are also provided.

The measuring arrangement includes a first voltage source 19, which preferably may be a controllable or non-controllable voltage source 19, for supplying a test voltage at one or more first measuring points 9a, 9b, 9c or 9d. Alternatively, the first voltage source 19 may be constructed as a DC voltage source or a frequency synchronous AC voltage source. Furthermore, an ammeter 21 is provided, which measures the current I supplied by the voltage source 19.

In addition, a second controllable voltage source 20, designed as a DC voltage source or a frequency-synchronous AC voltage source, is provided which supplies, for example, a DC voltage or an AC voltage to a first measuring point 9 of a further plastic intermediate flange disk 22. The respective second electrodes 10 and 10b of the plastic intermediate flange disks 22 and 22b are connected to a voltmeter 14. Since the use of a conductive fluid is assumed in the present invention, a voltage is measured by the connected voltmeter 14. This measured voltage is regulated to a value of zero Volt by a corresponding change in the DC or AC voltage provided, for example, by the second voltage source 20.

The further plastic intermediate flange disk 22 may for example be installed in a corresponding flange in the conduit 6 or the conduit 7. When the voltage at the voltmeter 14 is regulated to zero Volt, no current flows in this state in the illustrated measuring circuit of FIG. 4 via the line 5b. Likewise, when supplying the DC voltage or the AC voltage of the first voltage source 19 at all first measuring points 9a, 9b, 9c and 9d, regulating this voltage to zero Volt at the voltmeter 14 requires that no current flows in any of four lines 5a, 5b, 5c and 5d. The current flowing via the cooling water line 7 and the resistance 8 toward the equipotential bonding 2e is not important for the detection of damage. For example, in the event of damage to an inner coating of the container 1b, as shown in FIG. 4, a current flows from the first measuring point 9b via the conductive fluid in the container 1b to the equipotential bonding 2b, since this current flow due to damage to the non-conductive inner coating of container 2b can no longer be prevented.

For example, the display of voltmeter 14 was regulated to a value of zero Volt. In this case, no current flows through the line 5b. However, if the ammeter 21 shows a current flow, this current can—in the event of damage—flow only through to the liquid present in the container 1b, the defective inner coating, the container wall to the equipotential bonding 2b.

If several first measuring points 9a, 9b, 9c and 9d in several plastic intermediate flange disks 22a, 22b, 22c, 22d are simultaneously supplied by the voltage source 19, the container 1a, 1b, 1c or 1d, which has the damage to the inner coating, must still be identified after detecting a higher current on the ammeter 21 indicative of damage. In this case, the first measuring points 9a, 9b, 9c and 9d are switched on and off sequentially with switches not explicitly shown in FIG. 4. Based on the result, the container 1a, 1b, 1c or 1d causing the increased current flow is identified.

In all variants of the detection of damage, a measured value characterizing the damage can be displayed and an error or alarm signal in an analogue or digital form can be outputted. In this way, the invention can be integrated into an existing central plant control.

In summary, the following applies to the first variant both in the first alternative and in the second alternative of FIGS. 2 and 3.

All electrodes having the same designation (9a, 9b, 9c, 9d) and all ground connections could each be connected to one potential. In this way, a single measuring device can be used to monitor several containers. In this case, the damaged tank(s) 1a, 1b, 1c, 1d can be identified in the presence of a "bad" signal as follows:

1. The mechanical closing/opening of the liquid column in a pipe to a measuring point or between a container without damage and a measuring point has no significant effect on the measuring signal. The same applies to the electrical disconnection/connection of the measuring line to a measuring point proximate to the container (container without damage). In the event of damage, both aforementioned activities lead to reproducible signal bumps.
2. If a current flow is detected from the vessel wall via the lightning conductor with a current probe, this is a sure sign of damage to the lining, since no current flows in the "GOOD" state.

Substantially the same as for the first variant applies to the second variant in the third alternative, as shown in FIG. 4, provided that the further plastic intermediate flange plate 22 (without an additional letter) is connected to the two electrodes 9 and 10 (without an additional letter) is not placed at the same potential as the other plastic intermediate flange disks 22a, 22b, 22c, 22d and their electrodes 9a, 9b, 9c, 9d and 10b.

LIST OF REFERENCE SYMBOLS

1a-d container
2, 2a-e equipotential bonding/Lightning protection/grounding
3 first plant part/heat exchanger
4 second plant part/heat exchanger
5a-d first pipe
6 second pipe
7 third pipe
8 resistance
9, 9a-d first measuring point
10, 10b second measuring point
11 third measuring point
12 measuring device/grounding resistance tester
13 voltage source (AC voltage source or pulsed DC voltage source)
14 voltmeter
15A, 15B first terminal
16 second terminal
17 third terminal 18 ISO meter (resistance meter with voltage source, I and U measurement)
19 first controllable voltage source (DC voltage source or controllable AC voltage source or frequency-synchronous controllable AC voltage source)
20 second controllable voltage source (DC voltage source or controllable AC voltage source or frequency-synchronous controllable AC voltage source)
21 ammeter
22 plastic intermediate flange disk

The invention claimed is:

1. An arrangement for detecting damage at an inner coating of a container, wherein the container (1) comprises a container wall made of a conductive material, which is connected to a lightning protection or equipotential bonding (2) and wherein a first electrode for a first measuring point (9) is arranged in the container (1) or in a pipe (5) leading into the container (1), which first measuring point (9) is connected to a measuring arrangement, wherein the pipe (5) and the container (1) are at least partially filled with an electrically conductive process liquid, wherein the container wall has an insulating inner coating made of plastic, and wherein the container (1) is connected to a plant part (3) remote from the container (1) via a first pipe (5) made of an electrically non-conductive material, a second measuring point (10) is arranged on the plant part (3) remote from the container (1), the first measuring point (9, 9b) is arranged on a first electrode of a plastic intermediate flange disk (22, 22b) or on an electrode in the container (1), and the measuring arrangement is connected for electrical conduction with the first measuring point (9, 9b) and the equipotential bonding (2) or with second measuring point (10).

2. The arrangement according to claim 1, wherein the measuring arrangement comprises a voltage source (13) and a voltmeter (14), wherein the voltage source (13) is connected with a first terminal to the first measuring point (9b) and with a second terminal to the equipotential bonding (2) or to the second measuring point (10), and wherein the voltmeter (14) is directly connected to the first measuring point (9b) and directly or via a capacitance with the equipotential bonding (2) or the second measuring point (10).

3. The arrangement according to claim 1, wherein the measuring arrangement is a grounding resistance tester (12) or an ISO meter (18).

4. An arrangement for detecting damage to an inner coating of a container, wherein the container (1) comprises a container wall made of a conductive material, which is connected to a lightning protection or equipotential bonding (2) and wherein a first electrode for a first measuring point (9) is arranged in the container (1) or in a pipe (5) leading into the container (1), which first measuring point (9) is connected to a measuring arrangement, wherein the pipe (5) and the container (1) are at least partially filled with an electrically conductive process liquid, and wherein the container wall has an insulating inner coating made of plastic, wherein the measuring arrangement comprises a first controllable voltage source (19), which is connected with its first terminal via an ammeter (21) to the first measuring point (9, 9b) in a plastic intermediate flange disk (22b) and with its second terminal to the equipotential bonding (2), a second controllable voltage source (20), which is connected with its first terminal to a first electrode (9) of a further plastic intermediate flange disk (22) arranged in a second pipe (6) or in a third pipe (7) and with its second terminal to the equipotential bonding (2), and a voltmeter (14), which is connected between a second measuring point (10) of the further plastic intermediate flange disk (22) and a second measuring point (10b) of the plastic intermediate flange disk (22b).

5. The arrangement according to claim 1, wherein the measuring arrangement is connected to two first measuring points (9a, 9b) of two containers (1a, 1b) and/or to the second measuring point (10) and a third measuring point (11), which is arranged on a second plant part (4).

6. The arrangement according to claim 1, wherein the first plant part (3) and/or the second plant part (4) is a heat exchanger.

7. The arrangement according to claim 2, wherein the voltage source (13) is an AC voltage source or a pulsed DC voltage source.

8. The arrangement according to claim 4, wherein the first voltage source (19) and/or the second voltage source (20) is a DC voltage source or a controllable AC voltage source or a frequency-synchronous controllable AC voltage source.

9. A method for detecting damage to an inner coating of a container,
providing a container (1) connected to a lightning protection or equipotential bonding (2) with a first electrode for a first measuring point (9) arranged in the container (1) or in a pipe (5) before the container (1),
at least partially filling the pipe (5) and the container (1) with an electrically conductive process liquid,
providing a container wall of the container (1) with an insulating inner coating made of plastic,
providing a first plant part (3) with a second measuring point (10) connected with remote from the container (1, 1b) via a first pipe (5, 5b), and
detecting the damage to the inner coating of the container (1, 1b) by a measuring arrangement electrically connected to the first measuring point (9, 9b) and the equipotential bonding (2) or to the second measuring point (10), and
providing the first measuring point (9, 9b) on an electrode of a plastic intermediate flange disk (22, 22b), which has one or more electrodes in contact with the process liquid.

10. The method according to claim 9, wherein the measuring arrangement performs an insulation measurement or a resistance measurement for the detection of damage to the inner coating of the container (1).

11. A method for detecting damage to an inner coating of a container, wherein a container (1) connected to a lightning protection or equipotential bonding (2) with a first electrode arranged in the container (1) or in a pipe (5) before the container (1) is provided for a first measuring point (9), wherein the pipe (5) and the container (1) are at least partially filled with an electrically conductive process liquid, and wherein a container wall of the container (1) is provided with an insulating inner coating made of plastic, wherein the measuring arrangement performs a voltage measurement, wherein a first controllable voltage source (19) is provided, which is connected with its first terminal via an ammeter (21) to the first measuring point (9, 9b), which is provided by means of a first electrode of the plastic intermediate flange disk (22, 22b) and which is connected with its second terminal to the equipotential bonding (2), and a second controllable voltage source (20) is provided, which is connected with its first terminal to a further first measuring point (9) provided on a further plastic intermediate flange disk (22), and wherein the voltage measurement is performed with a voltmeter (14) between a second measuring point (10)

of the further plastic intermediate flange disk (22) and a second measuring point (10*b*) of the plastic intermediate flange disk (22*b*).

12. The method according to claim 9, wherein upon detection of damage to an inner coating of a container (1), a digital or analog error signal signaling the damage is outputted.

13. The method according to claim 9, wherein for detecting damage to the inner coating of the container (1), a measurement is performed with the measuring arrangement between at least two interconnected first measuring points (9*a*, 9*b*) of two containers (1*a*, 1*b*) and the second measuring point (10) and/or a third measuring point (11), which is provided on a second plant part (4).

* * * * *